United States Patent [19]
Johnson

[11] Patent Number: 6,070,401
[45] Date of Patent: Jun. 6, 2000

[54] GRAIN SAVER DAM

[76] Inventor: William A. Johnson, 2340 Ampere Dr., Louisville, Ky. 40299

[21] Appl. No.: 09/143,325

[22] Filed: Aug. 28, 1998

[51] Int. Cl.[7] .................................................... A01D 34/30
[52] U.S. Cl. .................................. 56/257; 56/158; 56/296
[58] Field of Search ............................ 56/158, 295, 159, 56/160, 161, 162, 173, 252, 257–260, 296–299, 14.5, 14.6

[56] References Cited

U.S. PATENT DOCUMENTS

| | | |
|---|---|---|
| 1,806,928 | 5/1931 | Bartels ....................................... 56/158 |
| 3,813,859 | 6/1974 | Fuller, et al. . |
| 3,866,400 | 2/1975 | May . |
| 3,896,610 | 7/1975 | Hiniker . |
| 3,961,465 | 6/1976 | Winings . |
| 4,156,338 | 5/1979 | Hengen . |
| 4,198,803 | 4/1980 | Quick et al. . |
| 4,891,932 | 1/1990 | Johnson . |
| 5,462,487 | 10/1995 | Farley et al. ............................. 460/105 |
| 5,762,793 | 6/1998 | Nurse, Jr. . |

*Primary Examiner*—Thomas B. Will
*Assistant Examiner*—Arpad Fabian Kovacs
*Attorney, Agent, or Firm*—Scott R. Cox

[57] ABSTRACT

A device for preventing rocks and dirt from entering a combine including a plurality of grain saver dam sections secured to a bracket by a bolt, bushing, mounting bracket and nut. The grain saver dam section includes a series of cutout sections and horizontal support sections.

4 Claims, 3 Drawing Sheets

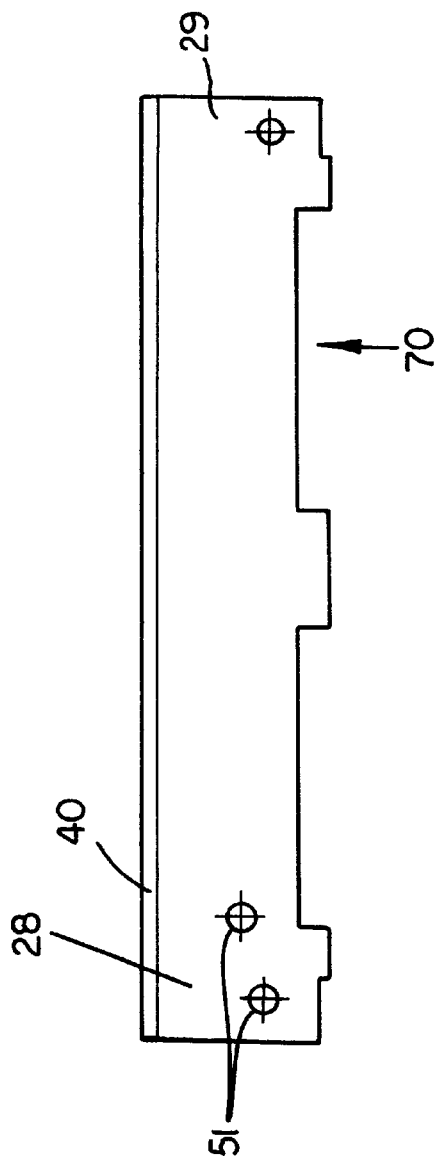
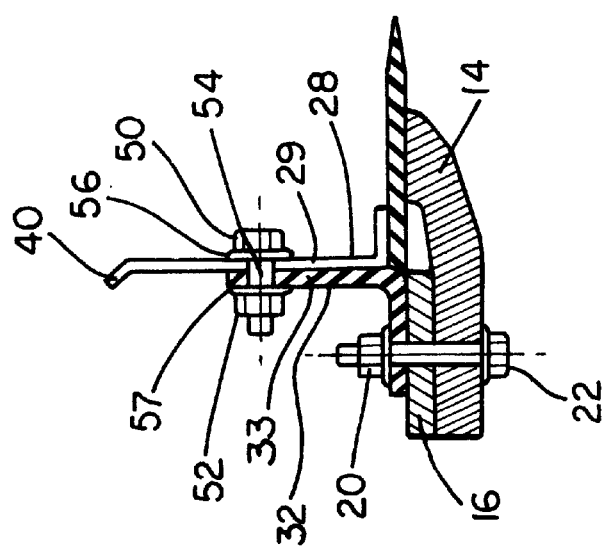
FIG. 4
FIG. 2

GRAIN SAVER DAM

BACKGROUND OF INVENTION

This invention relates to products used for harvesting of grains. More particularly, this invention relates to an improved grain saver dam mounted on a cutter bar by a bracket which utilizes an improved bushing system for enhancing the performance and durability of the grain saver dam.

Combines are well known in the art. In harvesting cereal grains, rigid cutter bars are often utilized. However, in low-growing crops, such as soybeans, it is advantageous to use a flexible or floating cutter bar assembly, to mow the crops as close to the ground as possible, especially in areas in which the land is uneven. Floating, flexible cutter bars are disclosed in U.S. Pat. No. 3,813,859, U.S. Pat. No. 3,866,400; U.S. Pat. No. 3,896,610; and U.S. Pat. No. 4,198,803.

While floating, flexible cutter bars increase the crop yield by cutting the stems closer to the ground, and are especially useful for harvesting of soybeans, some crop is still lost during harvesting.

The moisture content of the crop being harvested also affects loss of crop due to shatter. For example, in harvesting soybeans having a moisture content of about 13%, there is a loss of about two bushels of beans per acre. However, if the moisture content decreases to about 11%, the loss of beans increases to about four bushels per acre. Further, if the moisture content of the plant decrease to 9% or less, the loss per acre due to shatter increases drastically. This loss has been recognized in the art. U.S. Pat. No. 3,961,465 discloses a vacuum operated secondary harvesting device, designed to pick up beans or grain knocked to the ground, under the primary harvester. However, the device of this patent also picks up rock and dirt.

With floating cutter bars, rocks and dirt tend to be enter the harvesting apparatus during operation and cause damage to the intricate mechanism, resulting in significant downtime and repair. To prevent this damage, U.S. Pat. No. 4,156,338 disclosed a pair of rock deflectors, attached to opposite frame elements, which include a plurality of fore and aft fingers which are sufficiently wide to allow passage of the crop, but which also deflect larger rocks and foreign objects from entering into the combine mechanism. The patent also discloses a device designed to prevent damage to the cutting apparatus by preventing introduction of such objects into the combine mechanism.

U.S. Pat. No. 4,891,932 discloses a grain saver dam, for example, in FIG. 1. This grain saver dam moves up and down as the back bar (5) runs across the surface of the field. The grain saver dam is held in place by a series of bracket clips (32 and 33). These bracket clips are secured in place by a bolt (22) which passes through the bracket (33) and the cutter bar (4). While this grain saver dam (28) is efficient in preventing both rock and dirt from entering the combine and in saving grain, a problem has been discovered as a result of the method of securing the grain saver dam sections to the cutter bar (4). Many of these grain saver dams are utilized by individual farmers. They tend to tighten the bolts holding the grain saver dam sections against the bracket clips too tightly, thus, reducing the flexibility of the individual grain saver dam sections, which are secured to the flexible cutter bar.

Accordingly, it is an object of the invention to disclose an improved design for a grain saver dam mounted to a flexible cutter bar which allows the individual grain saver dam to flex as the cutter bar flexes.

It is another object of this invention to provide larger and additional wear point on the grain saver dam adding longevity to the product.

It is another object to disclose an improved design for the grain saver dam.

These and other objects are obtained by the design of the present invention.

SUMMARY OF INVENTION

The present invention is an improved grain saver dam mounted onto a cutter head on a sickle bar. The grain saver dam sections are secured by brackets to the cutter bar. As an improvement in the method of securing the grain saver sections in place, a series of bushings, preferably made of steel, are introduced which are placed on the bolts which are secured to the brackets to hold the individual sections of the grain saver dam in place. This method of securing permits greater flexing of the grain saver dam sections when in use. In addition, the design of the individual grain saver dam sections has been modified to create a series of overlapping grain saver dam sections, each with cut out sections and horizontal support sections, which fit together better for securing to the cutter bar.

BRIEF DESCRIPTION OF DRAWINGS

FIG. 2 is a side view of a cutter bar mounted on the combine showing the improved grain saver dam section mounted by the improved mounting system.

FIG. 4 is a front view of a grain saver dam section.

DETAILED DESCRIPTION OF PREFERRED EMBODIMENT

Figure 1:
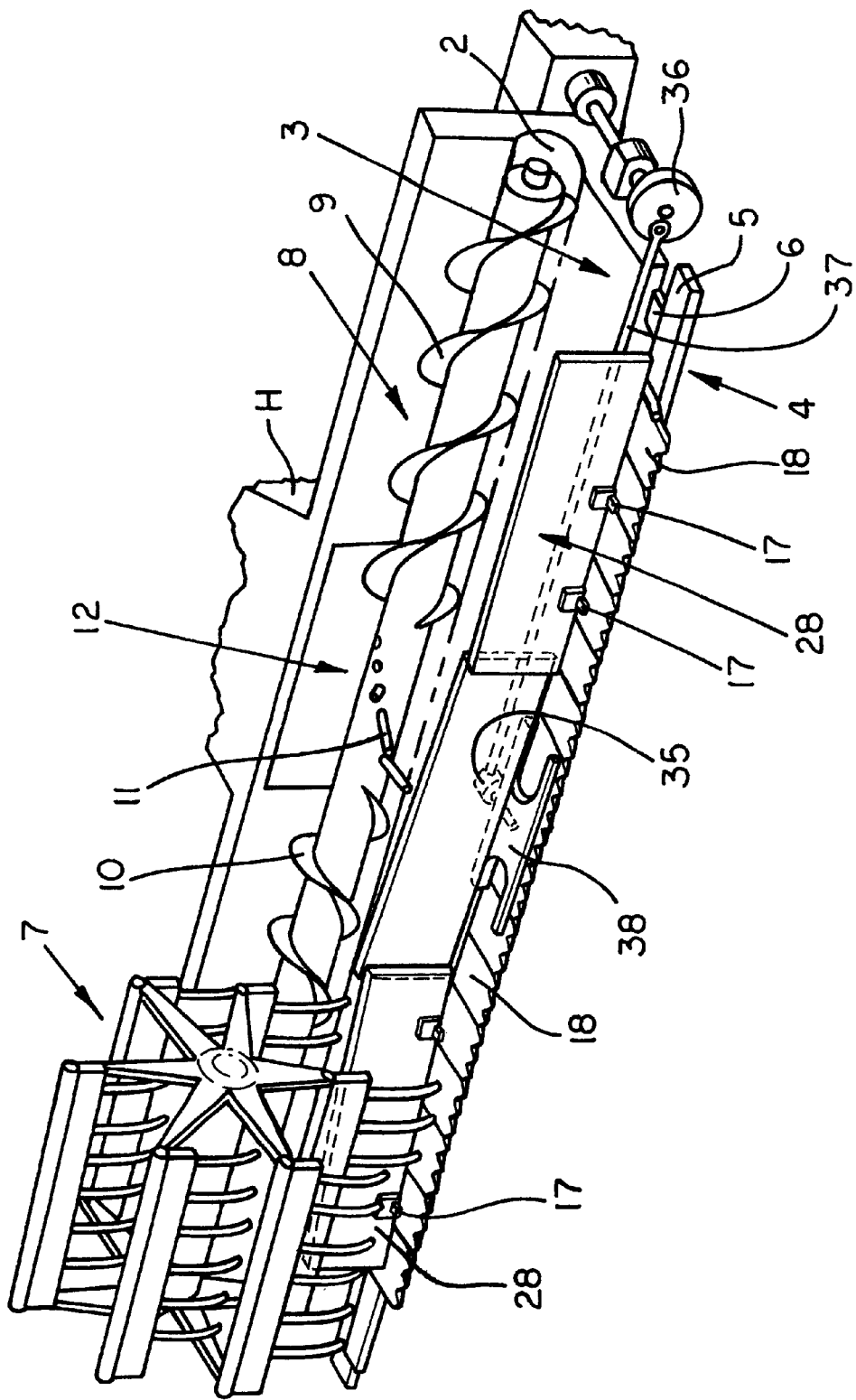
FIG. 1 is a perspective view of the header of a combine with grain saver dam sections mounted on the cutter bar using the new method of securing the grain saver dam sections in place.

Referring now to the drawings and particularly to FIG. 1, a header (H) for a crop harvesting combine supports a cutter bar (4). The preferred cutter bar is a flexible or floating type, and consists of a back bar (5), positioned by a supporting arm (6), which may be spring loaded. The support given to the back bar (5) by the spring-loaded supporting arm (6) allows the cutter bar to float along and conform to the contour of the ground and thereby float, relative to the header (H). This is extremely advantageous in harvesting low-growing crops, such as soybeans, so as to sever the stem of the soybean plant close to the ground. As the stems are severed by the cutter bar (4), a reel (7) assists the movement of the cut stems and plants to a collecting auger (8). The platform (3) of the header contains a depression forming a trough (2) in the area of the auger (8). The auger (8) is equipped with auger blades (9) and (10), which push the stems in opposite directions, toward the center, to feed the harvested crops to the chute (12). The auger contains retractable fingers (11), which seize upon the cut stems containing the pods of soybeans to help push them into the chute (12). A guard (14) is fastened to the back bar (5), as shown in FIGS. 2, while a sickle or knife bar (not shown) is reciprocally supported on the back bar (5). A series of hold-down clips (17) are arranged in space apart relation along the cutter bar to hold the knife bar (not shown) in place and prevent it from moving upwardly, relative to the guard. As can best be seen in FIGS. 1 and 2, a series of grain-saver sections (28) are mounted onto the back bar (5) of the cutter bar (4), by means of a bracket (32).

The bracket (32) is secured to the cutter bar (4) by a bolt (22) with a nut (20) passing through the bracket (32) at the supporting arm (6), as shown in FIG. 2. The upstanding portion (29) of the grain saver dam sections (28) is bolted to the vertical leg (33) of the bracket (32). A fold (40) is provided in the upstanding portion (29) of the grain saver dam (28).

Previously, grain saver dam sections (28) were bolted directly by a bolt to the mounting bracket (32) and held in place by a nut. Although the directions for the utilization of the grain saver dam (20) generally state that the grain saver dam sections (28) should not be tightly secured in place, practically speaking they are often tightly secured, either as a result of the unfamiliarity of the user with the product or through fear of loss of components of the product. Such tightening limits the maneuverability of the grain saver dam sections (28) in ordinary utilization. In such utilization the cutter bar (4) flexes as it passes across the ground, especially over uneven ground. If the grain saver dam sections (28) are not able to flex, they either bind or are bent out of square as a result of the movement of the cutter bar (4). In addition, as a result of this immovability of the grain saver dam sections (28), there is significant wear at the location where the bolt (50) is secured to the grain saver dam sections (28).

It has been surprisingly discovered that by introducing a bushing (54) between the nut (52) and a washer (57) through an enlarged opening (51) in the grain saver dam sections (28), significant flexibility is provided to the individual grain saver dam sections (28) which permits them to flex even when used on very uneven ground. Further, this bushing (54) provides an additional wear point on the grain saver dam sections (28) thereby adding longevity to the grain saver dam sections (28) in utilization.

Figure 3:
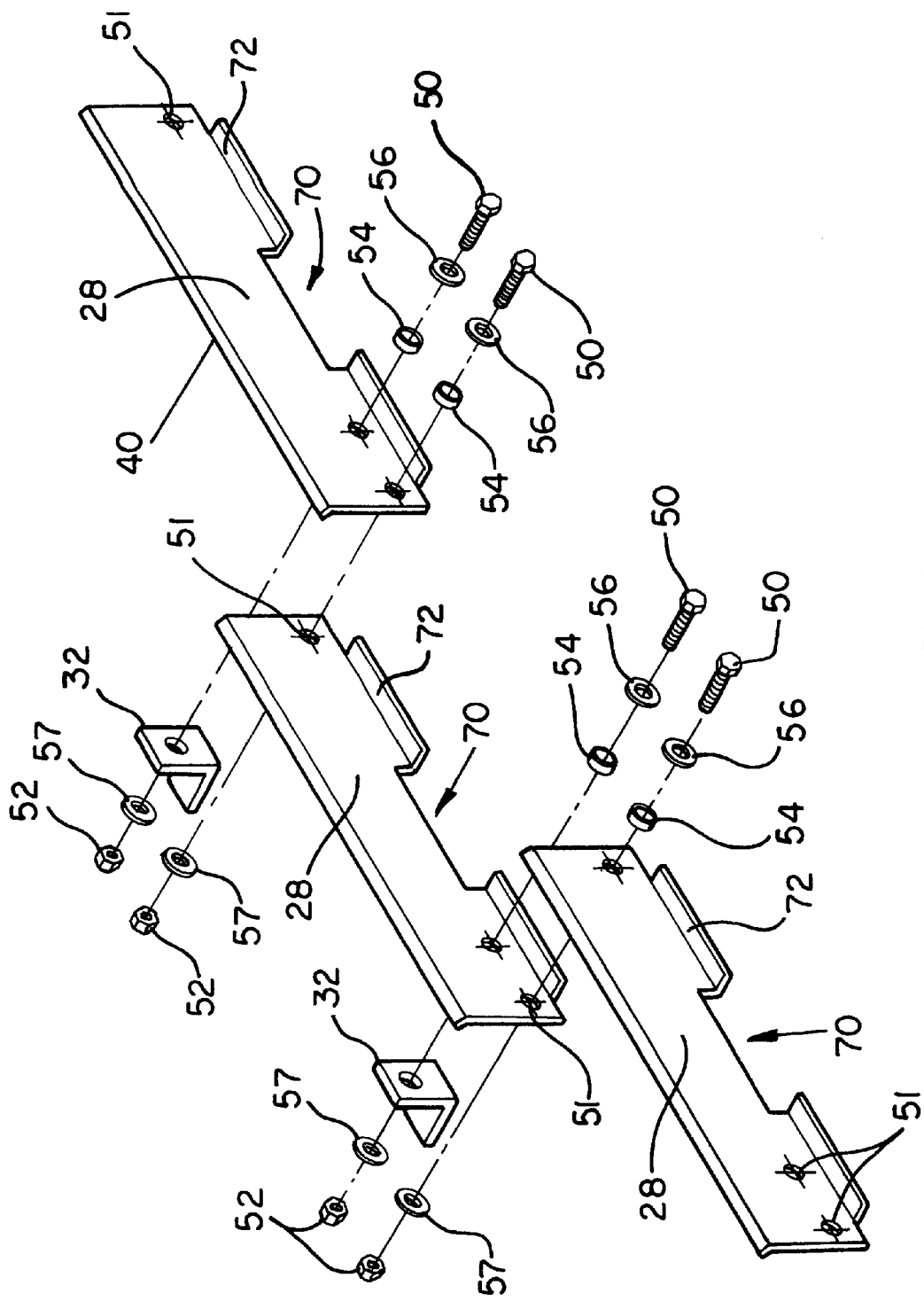
FIG. 3 is an exploded view of three improved grain saver dam sections along with the mounting brackets, bushings, bolts, nuts and washers used to secure grain saver sections in place to the back bar.

Preferably this bushing (54) is manufactured of a hardened material, such as steel, with an opening therein which is approximately the same size as the diameter of the bolt (50). The length of the bushing (54) should be at least about ⅙ of an inch longer than the elements through which it passes. For example, when it passes through two grain saver dam sections (28), as shown in FIGS. 2 and 3, it is less than about 1.0 inch in length. Preferably, the order of introduction of the elements of the securing system for securing the grain saver dam sections (28) in place to the mounting bracket (32) is the bolt (50), a washer (56), the bushing (54), the grain saver dam section (28), the bracket (32), the second washer (57), and a nut (52), preferably a nylon nut, which is secured in place to hold the grain saver dam section (28) in place. See FIG. 3. When the bolt (50) with washer (56), bushing (54), mounting bracket (32) and nut (52) is secured in place, the grain saver dam section (28) can flex as the cutter bar (4) bends and flexes as it passes across uneven ground regardless of how tightly the nut (52) is secured on the bolt (50).

The knife bar (16) is bolted to the blade or knife section (18) by means of a separate bolt (22) and nut (20), as shown in FIG. 2. The knife bar (16) is powered by a drive crank (36), attached to a drive rod (37), which, in turn, attaches to pitman (35), which is attached to the drive plate (38). The reciprocating motion, therefore, of the drive rod (37) and the pitman (35) connected to the drive plate (38), pushes the knife bar (16) and the knife sections (18) bolted thereto in a reciprocal fashion between the prongs of the guard members (14).

It is also possible to utilize a rigid cutter bar (not shown). Such a rigid cutter bar is supported by a channel member (not shown) attached to the platform of the header and an angle iron bracket. Again, the guard member is secured in place by a bolt which serves also to secure the angle iron bracket into position to act as a support through its vertical leg for the upstanding portion of the grain saver dam sections. It is possible, therefore, with the rigid cutter bar, to utilize the grain saver dam of unitary construction, stretching across the entire cutter bar.

As to the dimensions of the grain saver dam sections (28), a vertical height of about 2 to 5 inches is preferred with about 3 inches most preferred. The grain saver dam sections (28) are located directly on the knife sections (18) of the knife bar (16). A dam of 1 in. is not generally effective, either in preventing rocks and debris from entering the header portion of the combine or in trapping beans which have been prematurely harvested, due to shatter. The grain saving dam sections (28) are preferably 12 inches or so in length and are mounted so as to overlap about 1 inch from one section to the next section. Two adjacent sections are bolted together, using the securing system previously discussed. Thus, as the flexible back bar (5) flexes over uneven terrain, there is sufficient flexion between two adjacent grain saver dam sections (28) to prevent undue stress on the cutter bar (5).

The improved design for the individual grain saver dam sections (28) also includes a series of cut out sections (70) at the bottom of each grain saver section (28), and a series of horizontal support sections (72), as shown in FIGS. 3 and 4. These cut out sections (70) are designed to straddle the knife hold down to allow more flexing movement of the grain saver sections (28).

In addition, one or more horizontal support sections (72) are located along the bottom edge of each grain saver sections (28). These horizontal support sections (72) support the individual grain saver dam sections (28) where secured to the back bar (5). It also keeps the grain saver dam sections (28) on top of the knife sections (18), preventing the grain saver dam sections (28) from dropping down behind the knife sections (18).

As is indicated, a preferred form of the grain saver dam sections is shown in FIGS. 2 and 3. In this example, the upstanding portion (29) of the grain saver dam section (28) is preferably about 3 inches in height and the top portion is rolled back to form a rolled-back portion (40) of ⅜ inch in length, which defines an angle of about 45° (28).

As has been illustrated, the grain saver dam sections (28) are secured to the knife bar (16), supported by the bolts (22) normally used to secure the knife guards (14) in place. This, and the height of the grain saver dam (28), enhance the efficiency of the system. Because the grain saver dam (28) is quite close to the knife section (18), the cut stems are immediately transported over the grain saver dam (28) and into contact with the blades (9) and (10) of the auger (8). Rapid movement of the cut stems bearing the beans, prevents reel threshing and shatter in the area of the platform (3) of the combine head. The cut stems bearing the beans are quickly transported to the auger and then moved into the chute (12) of the combine harvester. Any beans which are prematurely dislodged are not lost onto the ground, but are maintained on the platform (3) and in trough (2) by the upstanding portion (29) of the grain saver dam sections (28). Thus, the normal loss of beans, even with plants of low moisture, are not encountered, as the prematurely-harvested beans do not fall back onto the ground, but are maintained on the platform (3) or the trough (2) of the header.

In addition, because of the improved design for securing the individual grain saver sections (28) to the back bar (5), great flexibility is present in the use of combines over ground that is significantly uneven. Individual grain saver dam sections (28) flex in use and still provide a system for collecting the stems and beans being cut. Further, the horizontal support sections (72) of each individual grain saver dam section (28) enhance the efficiency and effectiveness of the grain saver dam sections (28) by preventing the grain saver dam sections (28) from dropping down behind the knife sections (18).

Many modifications will occur to those skilled in the art and the description of the embodiments shown herein are meant to be exemplary and nonlimiting, except so as to conform to the scope of the appended claims.

What is claimed is:

1. A device for securing to a combine harvesting machine comprises a plurality of grain saver dam sections secured to a bracket by means of a bolt, bushing, mounting bracket and nut, wherein the bracket is secured to a cutter bar which is flexibly secured to the harvesting machine behind a reciprocating sickle bar and extends across an axis of the cutter bar, wherein the grain saver dam section comprises a series of elongated sections, each containing a cutout section and a horizontal support section at a bottom of the grain saver dam section.

2. The device of claim 1 wherein the grain saver dam sections contain overlapping end portions and wherein the sections are flexibly bolted together.

3. The device of claim 2 wherein the individual grain saver dam sections flex as the cutter bar moves.

4. The device of claim 1 wherein the cutter bar comprises a back bar with the series of grain saver dam sections secured to said back bar located behind the reciprocating sickle bar, having juxtaposed knife blade portions attached thereto, wherein the series of grain saver dam sections are secured together by the bolt, bushing, mounting bracket and nut, and wherein the bushing is secured within an opening in the grain saver dam sections.

\* \* \* \* \*